United States Patent
Stadler

(10) Patent No.: US 9,477,225 B2
(45) Date of Patent: Oct. 25, 2016

(54) METHOD FOR AUTONOMOUS DRIVING IN A CAR WASH AND A MOTOR VEHICLE

(71) Applicant: Audi AG, Ingolstadt (DE)

(72) Inventor: Michael Stadler, Arnsberg (DE)

(73) Assignee: AUDI AG, Ingolstadt (DE)

( * ) Notice: Subject to any disclaimer, the term of this patent is extended or adjusted under 35 U.S.C. 154(b) by 262 days.

(21) Appl. No.: 13/969,217

(22) Filed: Aug. 16, 2013

(65) Prior Publication Data

US 2014/0052312 A1 Feb. 20, 2014

(30) Foreign Application Priority Data

Aug. 17, 2012 (DE) .................. 10 2012 016 432

(51) Int. Cl.

| | |
|---|---|
| G08G 1/123 | (2006.01) |
| G08G 1/14 | (2006.01) |
| B60W 30/06 | (2006.01) |
| B60S 3/04 | (2006.01) |
| G05D 1/02 | (2006.01) |
| B60Q 1/48 | (2006.01) |
| G05D 1/00 | (2006.01) |

(Continued)

(52) U.S. Cl.
CPC . *G05D 1/00* (2013.01); *B60S 3/04* (2013.01); *B60W 30/06* (2013.01); *B62D 1/28* (2013.01); *B62D 15/025* (2013.01); *B62D 15/0285* (2013.01); *G05D 1/021* (2013.01); *G05D 1/0234* (2013.01); *G05D 1/0238* (2013.01); *G08G 1/14* (2013.01); *G08G 1/143* (2013.01); *G08G 1/168* (2013.01)

(58) Field of Classification Search
CPC ........... B60S 3/04; B08G 1/14–1/149; B08G 1/168; B08G 1/202; B60W 2250/22; B60W 30/18154; B60W 30/06; B60D 15/027–15/029

See application file for complete search history.

(56) References Cited

U.S. PATENT DOCUMENTS

| | | | |
|---|---|---|---|
| 5,226,436 A | 7/1993 | Kirby | |
| 6,661,516 B1 * | 12/2003 | Dietsch et al. | 356/399 |

(Continued)

FOREIGN PATENT DOCUMENTS

| | | |
|---|---|---|
| CN | 201736961 U | 2/2011 |
| CN | 202175022 U | 3/2012 |

(Continued)

OTHER PUBLICATIONS

English translation of DE102009057837, Google Translate Aug. 20, 2015.*

(Continued)

*Primary Examiner* — Fadey Jabr
*Assistant Examiner* — Kevin P Mahne
(74) *Attorney, Agent, or Firm* — Henry M. Feiereisen LLC

(57) ABSTRACT

A method for autonomously driving a motor vehicle in a car wash to enhance comfort and safety includes detecting a passageway of the car wash and determine with vehicle sensors the vehicle position and the vehicle orientation of the vehicle relative to the passageway. The vehicle is subsequently automatically driven into the car wash based on the vehicle position and the vehicle orientation, and automatically stopped in a washing position. After washing is complete, a completion signal signaling completion of a working step of the car wash is received or detected by the motor vehicle. Finally, the motor vehicle is automatically driven out of the car wash in response to the completion signal.

6 Claims, 2 Drawing Sheets

(51) Int. Cl.
  *B62D 15/02* (2006.01)
  *B62D 1/28* (2006.01)
  *G08G 1/16* (2006.01)

(56) References Cited

U.S. PATENT DOCUMENTS

| | | | |
|---|---|---|---|
| 2004/0267411 A1* | 12/2004 | Mayer et al. .................... 701/1 |
| 2010/0007525 A1* | 1/2010 | Shanbhag ............... G08G 1/14 340/932.2 |
| 2010/0060486 A1* | 3/2010 | Nakashima ........... G08G 1/168 340/932.2 |
| 2010/0186778 A1 | 7/2010 | Martin |
| 2010/0211267 A1* | 8/2010 | Shimazaki ............... B60R 1/00 701/42 |
| 2011/0161227 A1* | 6/2011 | Santo, Jr. ........................ 705/40 |
| 2012/0188100 A1* | 7/2012 | Min et al. .................. 340/932.2 |
| 2012/0253973 A1* | 10/2012 | Harter .......................... 705/26.9 |
| 2013/0085637 A1* | 4/2013 | Grimm et al. ................. 701/25 |

FOREIGN PATENT DOCUMENTS

| | | | | |
|---|---|---|---|---|
| DE | 35 40 767 | | 5/1987 | |
| DE | 10 2005 058 628 | | 6/2007 | |
| DE | 102009057837 | * | 6/2011 | ............. G08G 1/168 |
| DE | 20 2011 105 187 | | 12/2011 | |
| DE | 10 2010 056 064 | | 6/2012 | |
| EP | 1 480 097 | | 11/2004 | |
| EP | 1659285 A2 | * | 5/2006 | |
| WO | WO2011128965 | * | 10/2011 | ............... B62D 1/00 |

OTHER PUBLICATIONS

English translation of WO2011128965, Google Translate Aug. 21, 2015.*
Chinese Search Report issued on Mar. 13, 2015 with respect to counterpart Chinese patent application 201310350488.6.
Translation of Chinese Search Report issued on Mar. 13, 2015 with respect to counterpart Chinese patent application 201310350488.6.

* cited by examiner

METHOD FOR AUTONOMOUS DRIVING IN A CAR WASH AND A MOTOR VEHICLE

CROSS-REFERENCES TO RELATED APPLICATIONS

This application claims the priority of German Patent Application, Serial No. 10 2012 016 432.7, filed Aug. 17, 2012, pursuant to 35 U.S.C. 119(a)-(d), the content of which is incorporated herein by reference in its entirety as if fully set forth herein.

BACKGROUND OF THE INVENTION

The present invention relates to a method for autonomous driving a motor vehicle in a car wash. Moreover, the present invention relates to a corresponding motor vehicle for autonomous driving in a car wash.

The following discussion of related art is provided to assist the reader in understanding the advantages of the invention, and is not to be construed as an admission that this related art is prior art to this invention.

Car washes for vehicles are becoming increasingly more popular because the motor vehicle can be fully cleaned automatically in a relatively short time. The driver need not lend a hand in any cleaning phase.

There are various types of car washes. In one type, the driver of the vehicle drives into the car wash, turns the engine off, optionally leaves the vehicle, the washing and subsequent drying operation start and the driver finally drives the vehicle out of the car wash. In another type, the vehicle is automatically pulled with a tow chain from a washing chamber into a drying chamber, wherein the vehicle must be in idle. In still another type, the driver must drive the vehicle after the washing operation from a washing chamber to a drying chamber.

In any of these situations, the driver must drive the vehicle very precisely to a predetermined washing position in the car wash. Mostly, rails are set which limit the lateral position of the vehicle. An optical signal often indicates in the travel direction that the correct washing position has been reached. If necessary, the car needs to be driven for a short distance in reverse. In some situations, as indicated above, the driver needs to drive the vehicle onward from a washing position to a drying position in a drying chamber. This requires the driver to navigate a very narrow passage and pull up exactly at a specified position. This driving mode in car washes is for most drivers at least uncomfortable, and for others not even possible.

It would therefore be desirable and advantageous to obviate prior art shortcomings and to make driving motor vehicles through car washes more comfortable.

SUMMARY OF THE INVENTION

According to one aspect of the invention, a method for autonomously driving a motor vehicle in a car wash includes detecting a passageway of the washing line, detecting a vehicle position and a vehicle orientation of the vehicle relative to the passageway of the car wash, automatically moving the vehicle into the car wash based on the vehicle position and the vehicle orientation, automatically stopping the motor vehicle in a washing position, receiving or determining in the motor vehicle a completion signal, which signals a completion of a working step of the car wash, and automatically causing the motor vehicle to exit the car wash in response to the completion signal.

According to another aspect of the invention, a motor vehicle for autonomously driving in a car wash includes a detection device for detecting a passageway of the car wash and a vehicle position and vehicle orientation of the motor vehicle relative to the passageway of the car wash, a control device for automatically entering the vehicle into the car wash based on the vehicle position and the vehicle orientation and for automatically stopping the motor vehicle in a washing position, and a device for receiving or determining a completion signal, which signals completion of a working step of the car wash, wherein the control device for automatically driving the motor vehicle out of the wash is triggered by the completion signal.

Advantageously, a motor vehicle may thus enter a car wash fully automatically, remain there during the washing and optionally the drying process, and then again completely automatically move out of the car wash, either forward or backward. This fully automatic driving can be described as autonomous driving in a car wash, wherein the driver either exits the car and the vehicle drives without a driver, or the driver will simply remains seated and is driven by the vehicle.

According to an advantageous feature of the present invention, the method may be controlled by operating a mobile terminal. This means that at least the autonomous driving in the car wash is triggered or initiated by the mobile terminal (e.g., mobile phone). Alternatively, the autonomous driving may also be activated, for example, by pressing a button, by a voice command or by automatic recognition of a car wash.

According to another advantageous feature of the present invention, prior to detection of the passageway of the car wash, an orientation signal may be sent by the car wash, which enables the motor vehicle to automatically locate and/or identify the car wash. Such an orientation signal may also be used to allow the vehicle to automatically detect the car wash from a distance and to find its location. Automatic steering and control maneuvers can then be performed even before arriving at the car wash.

According to another advantageous feature of the present invention, the passageway of the car wash may be detected based on stationary orientation elements placed in the car wash. Such orientation elements may have predefined properties so that they can be more easily and more reliably determined by the motor vehicle.

According to another advantageous feature of the present invention, the sensor system of a parking assistance system of the vehicle may be used to detect the vehicle position and the vehicle orientation relative to the passageway. This makes it possible to use the sensor system of a parking assistance system also for other purposes. Otherwise, an additional expensive sensor system would be required in a motor vehicle for autonomous driving in a car wash.

According to another advantageous feature of the present invention, the possibility of autonomous driving may be communicated to the driver before autonomously entering the car wash, so that the driver has to opportunity to activate an appropriate automatic mode. The driver may be informed, for example, acoustically or visually that he can activate an autonomous driving mode. The driver is thus advantageously informed about when the motor vehicle can be handed over to the automatic mode.

According to another advantageous feature of the present invention, when the motor vehicle is automatically stopped in the washing position, the transmission of the vehicle may be shifted into neutral and the engine of the motor vehicle may be turned off. The driver then need not be concerned with the drive train of the vehicle, guaranteeing a fully autonomous operation of the vehicle in a car wash.

According to another advantageous feature of the present invention, the motor vehicle may also receive a driving (go-ahead) signal from the car wash and can move in response automatically from the washing position into another working position. This is advantageous, for example, when the car wash has a washing chamber and a drying chamber and the motor vehicle is to be moved automatically, after having been washed, from the washing position in the washing chamber to a drying position in the drying chamber.

According to another advantageous feature of the present invention, when or after the vehicle exits the car wash automatically, a message may be sent to an output device to informing a driver of the motor vehicle about the state of the motor vehicle. This is particularly advantageous when the driver of the motor vehicle has left the motor vehicle before entering the car wash and the vehicle passes through the car wash autonomously without a driver. The driver then need not be in close proximity of the car wash, but can receive the message on a display screen located, for example, in a lounge or restaurant or also, for example, on a mobile phone or other mobile output device.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
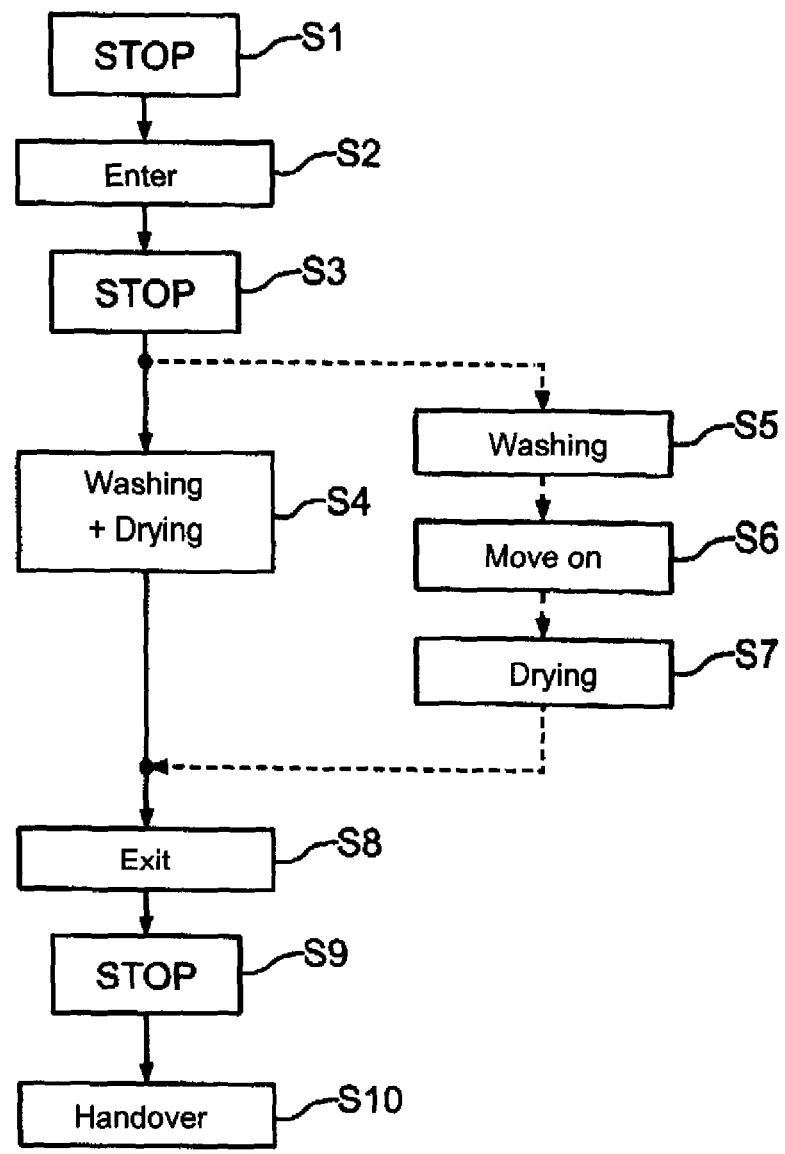
FIG. 1 shows schematically a process flow according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Entering and/or driving through a car wash with a motor vehicle hereby occurs autonomously. This means that the driver can leave the car and that the motor vehicle, especially a passenger car, moves through the car wash entirely automatically. Alternatively, the driver can remain seated in the car and is automatically driven through the car wash.

A car wash is here to be understood as any type of car wash facility, in which a motor vehicle is washed and optionally dried. This includes, as mentioned above, car washes where the vehicle is at rest during the wash process and optionally the drying process, where the vehicle continuously moves during the wash and/or the drying process, or where the vehicle is after washing only moved from a washing position into a drying position. Generally, the method according to the invention can also be applied to other car washes, where a vehicle must be driven.

Turning now to the drawing, and in particular to FIG. 1, a driver drives the vehicle 1 to be washed to a car wash. Optionally, the vehicle recognizes the car wash automatically and reports this to the driver via suitable acoustical or optical instruments in the vehicle. For example, the vehicle can be informed by the car wash with an identification signal (ping) about the identity and/or the type of car wash and its exact location. The vehicle then drives automatically, semi-automatically or manually to the entrance of the car wash.

When driving in front of the car wash is performed manually or semi-automatically, the driver must be signaled when autonomous driving in/on the car wash is possible. Once autonomous driving is possible, the driver can start a handover procedure. For this purpose, he stops the vehicle at step S1 of FIG. 1 and activates the autonomous mode of the vehicle. If the vehicle is equipped with a manual transmission, the driver may need to switch to idle for the transfer.

To activate the autonomous mode of the vehicle, the driver presses for example a button or another actuator in the vehicle or he sends a corresponding voice trigger signal to the vehicle control.

Figure 2:
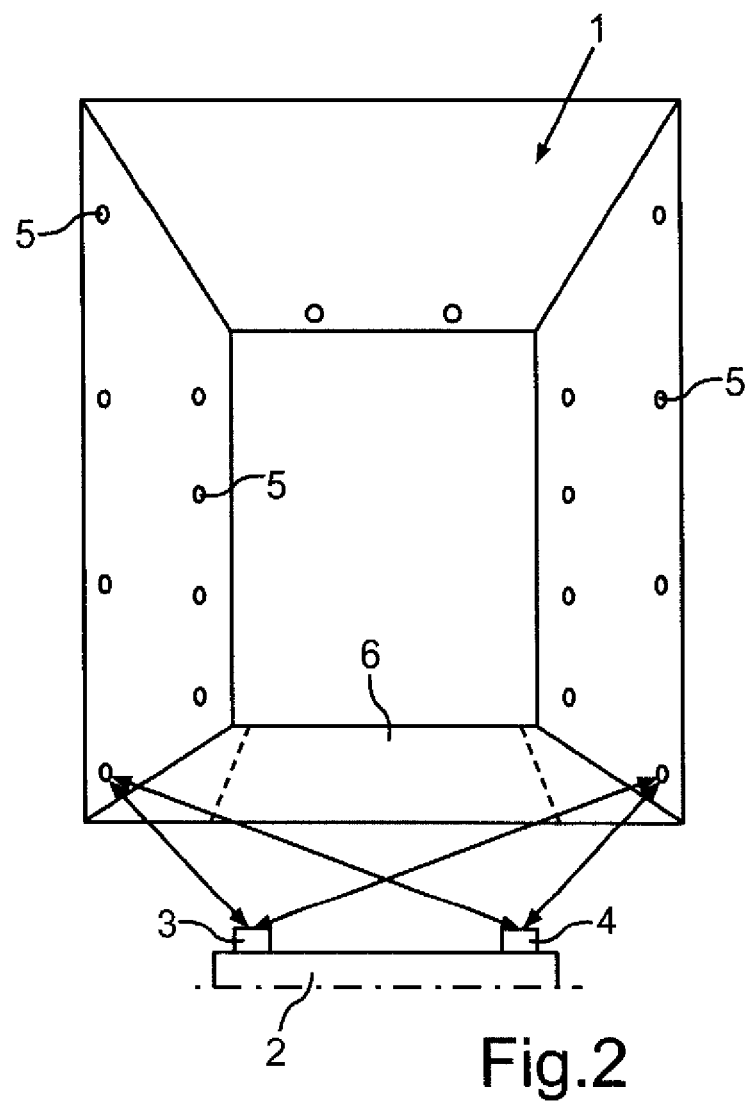
FIG. 2 is a diagram of a car wash, which can be autonomously navigated.

After activating the autonomous mode, the vehicle automatically enters the car wash at step S2. This implies that the vehicle knows the vehicle position and the vehicle orientation relative to the predetermined travel passageway of the car wash before and while the vehicle enters. To determine the vehicle position and the vehicle orientation, the vehicle utilizes a sensor system integrated into the vehicle. This may be, for example, the sensor system of a parking assistance system. The two parameters vehicle position and vehicle orientation, as will be explained in more detail in conjunction with FIG. 2, are determined by the vehicle based on orientation elements in the car wash.

The vehicle must now enter into the car wash up to a predetermined washing position. In other words, the vehicle must stop at the washing position at step S3. This stop occurs automatically when the vehicle sensor system detects that the washing position has been reached.

The car wash detects in a conventional manner when the washing position is reached and starts the processing steps relating to washing and possibly drying the vehicle at step S4. Alternatively, the processing steps relating to washing and drying may also be started manually.

In the aforedescribed case, the vehicle is washed and dried at a single position, here the washing position. However, when the driver drives his vehicle to a different car wash with a washing chamber and a separate drying chamber, then the vehicle must be moved after washing into the drying chamber. This different type of car wash was transmitted to the vehicle, optionally automatically in the identification signal of the car wash, at the beginning of the autonomous driving or before the autonomous driving. Specifically adapted to the type of car wash, washing is then performed at step S5, after the vehicle has stopped in the washing position in accordance with step S3. After the last processing step of the washing process, the car wash transmits a signal to the vehicle to move onward. Triggered by this onward driving signal, the vehicle and/or the engine is restarted, the appropriate gear is engaged and the vehicle moves at step S6 onward from the washing position into a drying position, i.e. from the washing chamber into a drying chamber. When the vehicle reaches the drying position, it may switch back to idle and the engine may be turned off. Thereafter, the various drying steps are performed by the car wash at step S7.

After the steps S4 and S7, the vehicle is cleaned and can exit the car wash. For this purpose, the vehicle receives from the car wash a control pulse, i.e. a departure signal. After receiving this departure signal, the vehicle starts the engine and engages the suitable gear or enters an appropriate driving mode. By starting the motor, another part of the autonomous driving has begun, namely exiting from the wash at step S8. The vehicle moves automatically onward, again controlled by its sensors, through the passageway of the car wash until it has left the car wash facility. The sensor system of the vehicle detects that the vehicle has completely exited from the car wash facility, i.e. it is in a pick-up position outside the car wash facility. The vehicle in autonomous mode is automatically stopped at this pick-up position, it is switched to idle and the engine is optionally stopped (step S9).

The pick-up position need not be located directly at the exit of the car wash facility. Instead, the pick-up position may also be located on a waiting parking lot and may, if necessary, be determined dynamically by the vehicle and the car wash facility. Such a waiting parking lot would have the advantage that the vehicle need not be picked up by the driver immediately after exiting the car wash. Instead, the driver may have stopped, for example, in the adjacent gas station to have, for example, a cup of coffee while the vehicle moves completely autonomously through the car wash. After washing is complete, the driver can then be informed, for example, on a display screen in the gas station that his vehicle ready to be picked up. Alternatively, the driver may also receive a message on his mobile phone or another mobile device that his car is ready. The driver can then pick up his vehicle when he has time.

In any case, a handover to the driver must occur after the autonomous driving at step S10. This handover occurs essentially by turning off the autonomous mode. To this end, depending on the situation, the vehicle must automatically switch to idle and optionally stop the engine. The driver can then safely take over the vehicle.

Alternatively, the transfer at step S10 can also occur immediately after the autonomous stop at step S9, if the driver has remained seated in the vehicle while driving through the car wash. In this case, for example the engine can continue to run and only the idle is engaged in the autonomous mode and the parking brake is activated. To continue driving manually, the driver then only needs to release the parking brake and engage the gear.

FIG. 2 shows an exemplary washing chamber of a car wash, wherein the washing equipment is not shown. A vehicle 2 intends to enter this washing chamber autonomously. The vehicle 2 has here symbolically two sensors 3, 4 with which the vehicle can determine its position and orientation relative to the car wash or a driving passageway of the car wash. For this purpose, several orientation elements 5 are stationarily arranged in the washing chamber 1. The vehicle 2 calculates a travel passageway 6 by using these orientation elements 5. Optionally, the travel passageway 6 may also be three-dimensional, which is important for taller vehicles.

In the example, FIG. 2 only symbolically indicates that the sensors 3 and 4 are used to do determine respective distances to the orientation elements 5. The vehicle position and the vehicle orientation can then be determined from these distances and the knowledge of the sensor positions on the vehicle. A trajectory along which the vehicle drives through the car wash can then be estimated based on vehicle position and the vehicle orientation.

However, more than two orientation elements 5 in the car wash may be used for determining the vehicle position and the vehicle orientation. The orientation elements need not be arranged so as to be permanently static, Instead, they may also be arranged on movable washing equipment or on columns that can be retracted into the ground.

The sensors 3, 4 on the vehicle 2 are not limited to the number of 2. Instead, only a single sensor may be used, or three or more sensors. The sensor(s) may be based on different physical principles. For example, radar sensors, optical sensors, ultrasonic sensors and the like may be employed.

Advantageously, the comfort during use of a vehicle is enhanced by the aforedescribed autonomously entering or driving through the car wash. In addition, autonomous driving in a car wash also enhances safety not only for the vehicle, but also for the car wash itself.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for autonomously driving a motor vehicle to and in a car wash, the method comprising:
   receiving from the car wash an identification signal informing the motor vehicle about an identity or a location of the car wash,
   driving the vehicle automatically, semi-automatically or manually to an entrance of the car wash based on the received identification signal,
   switching the motor vehicle to automatic control when autonomous driving in the car wash is possible,
   detecting with the aid of a sensor system of the motor vehicle a passageway of the car wash, wherein the passageway has an entrance and an exit sequentially arranged in a travel direction of the motor vehicle,
   detecting a vehicle position and a vehicle orientation of the motor vehicle relative to the passageway of the car wash,
   detecting with the sensor system orientation elements stationarily placed in the car wash and guiding the motor vehicle, with the aid of the sensor system of the motor vehicle, through the entrance of the passageway into the car wash,
   stopping the motor vehicle when the sensor system determines, based on orientation elements disposed in the car wash, that a washing position has been reached,
   receiving from the car wash or determining by the motor vehicle a completion signal, which signals completion of a working step of the car wash,
   with the aid of the sensor system and the orientation elements, driving the motor vehicle out of the car wash through the exit of the passageway in response to the completion signal, and
   deactivating autonomous driving after exiting the car wash.

2. The method of claim 1, wherein the method is controlled by operating a mobile terminal.

3. The method of claim 1, further comprising informing a driver of a possibility for autonomous driving in the car wash prior to entering the car wash, thereby allowing the driver to activate an appropriate automatic mode.

4. The method of claim 1, further comprising, when the motor vehicle stops in the washing position, shifting a transmission of the motor vehicle into neutral and turning an engine of the motor vehicle off without intervention by a driver of the motor vehicle.

5. The method of claim 1, wherein the motor vehicle receives a go-ahead signal from the car wash, with the go-ahead signal causing the motor vehicle to move from the washing position into a different working position in the travel direction of the motor vehicle.

6. The method claim 1, further comprising transmitting a message to an output device, when the motor vehicle autonomously exits the car wash in the travel direction of the motor vehicle, to inform a driver of the motor vehicle about a state of the motor vehicle.

\* \* \* \* \*